Patented Dec. 16, 1952

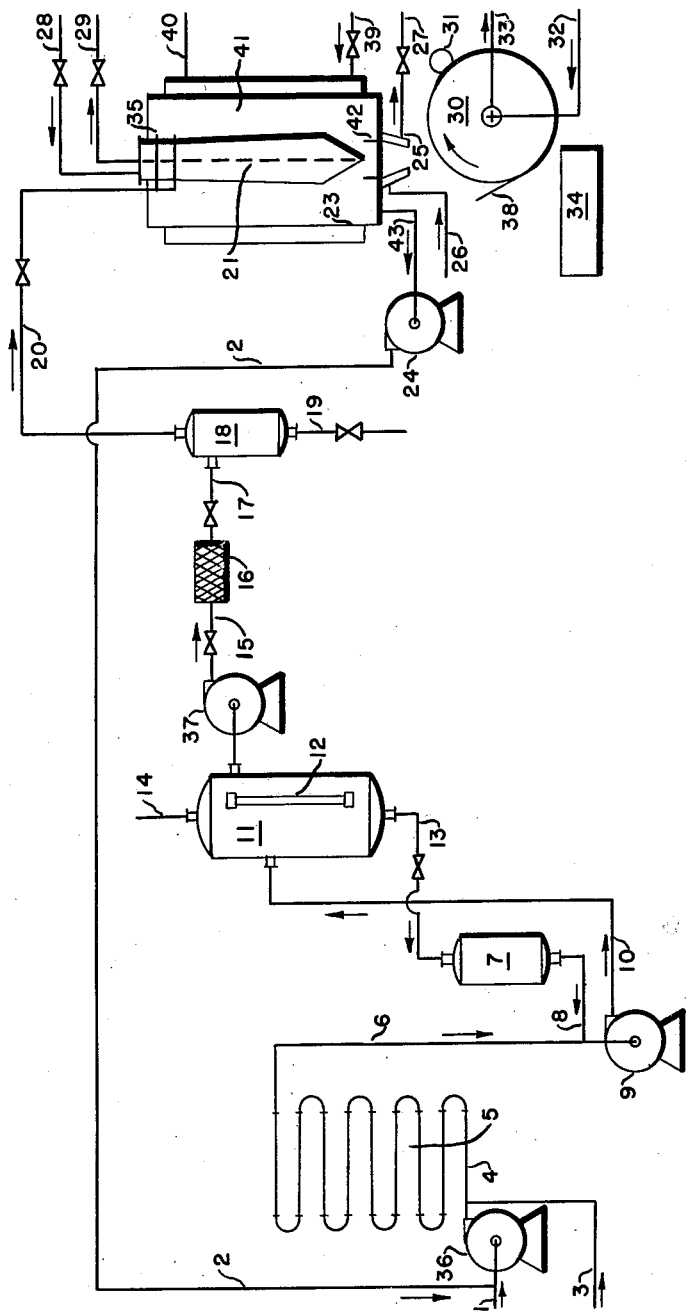

2,622,105

UNITED STATES PATENT OFFICE 2,622,105

PROCESS FOR MANUFACTURE OF BENZENE HEXACHLORIDE

Leo A. Miller, James H. Dunn, Clarence M. Neher, and Stephen N. Hall, Baton Rouge, La., assignors to Ethyl Corporation, New York, N. Y., a corporation of Delaware Application May 10, 1949, Serial No. 92,268

2 Claims. (Cl. 260—648)

This invention relates to the manufacturing of benzene hexachloride. More specifically, the invention relates to an integrated method of continuously manufacturing and recovering benzene hexachloride.

An important object of the invention is to make possible the continuous manufacture and recovery of benzene hexachloride. A further object is to obtain high overall conversion and recovery of benzene hexachloride. An additional object is to obtain a product of uniformly high gamma isomer content. Other objects will appear hereafter.

Benzene hexachloride, also referred to as Gammexane or hexachlorocyclohexane, has become an important industrial chemical. Although the compound has been known since early in the nineteenth century, only recently has its insecticidal potency been recognized. With the appreciation of the value of benzene hexachloride as an economic poison, numerous attempts have been made to devise a practical manufacturing process.

The methods proposed heretofore are principally based upon batch reactions resembling laboratory scale operations. For example, one method involves the complete chlorination of benzene. This method results in the formation of a gummy mass, because of the presence of objectionable incompletely chlorinated compounds, and renders isolation of the product very difficult.

Another method of manufacture comprises the chlorination of benzene in the presence of aqueous caustic solution. Still another procedure involves chlorination of a falling film of benzene. The resulting solution is then boiled down or evaporated until solid benzene hexachloride is precipitated. This material is then separated by filtration and drying of the solids.

These prior methods all exhibit the disadvantage of being essentially batch operations requiring filtration or other separation methods based on the existence of a solid phase. As far as we have been able to determine, there is no method as yet developed which provides a continuous operation and a recovery method integrated with a continuous reaction method.

Broadly speaking, our invention comprises the chlorination of benzene with a limited amount of chlorine, the reaction mixture being maintained substantially only in the liquid phase. The reaction mixture is then purified by intimate contacting with an aqueous caustic solution. The aqueous phase is completely separated from the purified non-aqueous phase. The phase containing benzene and benzene hexachloride is then processed for recovery. The recovery step consists of vaporizing substantially all the benzene and in fusing the benzene hexachloride at an elevated temperature. The benzene vapor is condensed and recovered. The fused benzene hexachloride is cooled and solidified. It is then comminuted and is then ready for packaging and sale.

A principal advantage of our reaction method is that a product mixture is obtained which is substantially only liquid and is free of solids. It has been found that an entirely liquid mixture is essential for efficient recovery and purification steps. The benefits of a reaction mixture free of solids has not been appreciated heretofore, but have now been amply demonstrated by the results of our process.

There are several modes of carrying out the benzene-chlorine reaction to give the product solution required by our process. In all instances, however, the method is characterized by the use of an excess of benzene so that the benzene hexachloride resulting from reaction is entirely dissolved therein.

The reaction is usually carried out with the assistance of actinic light which promotes the addition reaction of chlorine to benzene. Suitable light sources are mercury vapor lights emitting ultraviolet light, fluorescent lights emitting light approximating daylight in spectral distribution and filament lamps emitting infrared light. The preferred light sources are fluorescent lights emitting a white light having maximum intensity at 4000 to 7000 angstrom units.

Various reactor designs are suitable for the process. The simplest reactor possible utilizes a reaction pot or vessel fitted with a central transparent well for a light source. Liquid benzene, or a stream predominating in benzene, is fed to the vessel and chlorine is dissolved therein. The addition reaction of benzene and chlorine is initiated and maintained by means of the actinic light. In carrying out the reaction in pots or kettles of this type, it has been found desirable to use more than one vessel. The partially reacted mixture from the first kettle is transferred to a second to ensure the thorough mixing and irradiation necessary for complete reaction of the chlorine.

A preferred method of carrying out the reaction involves dissolving gaseous chlorine in liquid benzene or a predominantly benzene liquid.

This solution is then maintained as a stream of limited cross sectional area and completely irradiated with actinic light for an extended period sufficient to convert substantially all the chlorine to benzene hexachloride. The proportions of chlorine used are such that the amount of benzene hexachloride formed is not sufficient to appear as a solid phase in the reaction.

The reaction of chlorine and benzene can be carried out over a wide range of temperatures with excellent results. The temperature is not critical because the reaction is maintained at a rapid rate by means of the actinic light. We have carried out the reaction at temperatures of about 30 to over 80° C. and have obtained uniformly high reaction rates and chlorine conversion to benzene hexachloride. In general, the preferred range of reaction temperatures is 30 to 60° C.

The reaction is carried out at atmospheric pressure or pressures slightly above atmospheric. The positive pressures we ordinarily employ, of 5 to 15 pounds per square inch, gauge, are used because of the pressure drop through the system instead of being necessitated by the reaction itself.

The composition of the feed stream to the reaction step is not critical. As a general requirement, the proportions of the chlorine and benzene should be such that the reacted mixture will be free of any solidified or precipitated benzene hexachloride. The preferred proportions are those which will produce a benzene hexachloride concentration of 15 to 28 weight percent in the product stream from the reaction. As the feed to the reaction step contains a substantial excess of benzene, a large portion of the benzene feed is a recycle stream. This recycle stream, with fresh benzene feed, contains a variable quantity of benzene hexachloride, the exact amount being dependent on the efficiency of the subsequent recovery operation and the rate of production. The benzene stream in our process normally contains from 2 to 15 weight percent benzene hexachloride. The amount of chlorine and benzene to be mixed with the recycle stream can be readily calculated so that the completely reacted mixture will contain the desired amount of benzene hexachloride. Thus, if the recycle benzene stream contains 5 weight percent benzene hexachloride, from 8.6 to 23.4 pounds of chlorine, and 3.2 to 8.6 pounds of benzene are added per 100 pounds of recycle to give a reacted mixture containing from 15 to 28 weight percent benzene hexachloride. If the recycle benzene stream contains 15 weight percent benzene hexachloride, it requires 13.2 pounds of chlorine and 4.8 pounds of benzene, per 100 pounds of recycle, to give a product solution containing 28 percent benzene hexachloride.

The feed stream composition is not limited to the range which will give a 15 to 28 weight percent benzene hexachloride concentration in the reacted solution. Higher final concentrations of benzene hexachloride are permissible, but provisions must then be made for keeping the lines heated above about 45° C. Lower concentrations of benzene hexachloride than 15 weight percent are also permissive. However, in these circumstances the quantity of benzene recycled and processed is unnecessarily high.

Referring to the figure showing a preferred embodiment of our process, numeral 1 denotes a line for the feed of fresh benzene to the system. A recycled benzene stream in line 2 is mixed with the fresh benzene supply. The chlorine feed is added to the system by line 3. The chlorine is mixed with and dissolved in the mixed benzene feed and fed through line 4 to reactor 5.

The reactor 5 of the embodiment illustrated by the figure comprises a series of tubular conduits of light transmissive material. The tubes are arranged in a bank for easy cooling and irradiation with actinic light. Cooling and irradiation means are not shown herein. The reaction mixture is introduced at a rate such that the residence time is adequate to allow relatively complete conversion of the chlorine to benzene hexachloride. The product mixture, discharged from reactor 5 in line 6 contains benzene hexachloride dissolved in benzene plus minor quantities of impurities. The impurities are principally traces of unreacted chlorine and small quantities of hydrogen chloride. The hydrogen chloride probably results from the substitution chlorination of hydrocarbon impurities found in even nitration grade commercial benzene. These usually include aliphatic and cycloaliphatic compounds.

The time required for complete reaction of the chlorine in the feed mixture depends to some extent upon the specific design of the reactor. When chlorination kettles or pots are employed, it has been found desirable to employ a residence time of over 20 minutes. In the reactor 5 illustrated by the preferred embodiment shown in the figure, a residence time of 5 to 20 minutes is preferred.

*Purification of product mixture*

The product stream from the reactor contains, in addition to the benzene hexachloride formed in the reaction, small amounts of impurities. These impurities include unreacted chlorine. In addition the product mixture also contains traces of hydrogen chloride and chlorinated hydrocarbons other than benzene hexachloride. The last named impurities result from the presence of hydrocarbon impurities in the benzene feed as heretofore mentioned. Such impurities, such as cyclohexane and cyclopentane, are commonly found in commercially available benzene. The usual range of chlorine and hydrogen chloride impurities in the reactor solution is from 0.02 to 0.14 weight percent of free chlorine and 0.01 to 0.07 weight percent hydrogen chloride. These impurities must be completely removed to make possible fully effective recovery of the benzene hexachloride.

The removal of free chlorine and hydrogen chloride from the product solution is essential for several reasons. Even small amounts of these impurities are responsible for lower product quality. In addition, if free chlorine or hydrogen chloride is present, nonmetallic materials of construction are necessary in the succeeding recovery equipment.

We carry out the purification operation by intimately contacting the reactor product solution with caustic solution. The caustic solution is then settled out of the mixture. The nonaqueous benzene-hexachloride phase is not however completely freed of caustic solution by settling. It has been found that the caustic sloution emulsifies to a slight extent in the benzene phase. We have found that this aqueous emulsion can be coalesced or coagulated into a separable, continuous phase by passing the benzene layer from the settling operation, through a bed or mat of fibrous inert material. A preferred material is fibrous glass.

The preferred mode of contacting the reactor product solution with a caustic solution is by centrifugal contacting. By centrifugal contacting we mean feeding both the caustic solution and the product solution from the reactor to a centrifugal pump and contacting therein. We have found that, by scrubbing or contacting the reactor product solution with caustic in this manner, the free chlorine and hydrogen chloride are completely neutralized. Conventional means of liquid-liquid contacting, particularly countercurrent scrubbing in a packed column, is thus rendered unnecessary.

The strength of the caustic solution is not critical providing that enough sodium hydroxide in the caustic solution circulated is ample to provide neutralization of the hydrogen chloride impurity. We find that a solution containing 3 to 5 weight percent sodium hydroxide is preferred for our purpose. In practice, we continue to circulate caustic solution until the free caustic content has been reduced to about 3.5 weight percent sodium hydroxide. The caustic concentration should not be allow to drop below 3 weight percent concentration because the density also decreases. The caustic solution is not then separable from the benzene-benzene hexachloride phase by settling. Normally, the caustic solution is circulated at approximately the same volumetric rate as the product solution from the reactor.

Referring to the figure, product solution, discharged from the reactor through line 6, is mixed with caustic solution from hold-up tank 7. The caustic is fed through line 8 to mix with product solution in line 6. The combined liquids are then fed to centrifugal pump 9 for the centrifugal contacting heretofore described. The stream leaving pump 9 is discharged through line 10 to settling drum 11.

The mixture of caustic and product solution is retained in settling drum 11 for a period adequate to allow the caustic solution to settle. A period of 2 to 5 minutes is adequate for this purpose. A sight glass 12 allows ready observation of the interface of the two liquid phases. The caustic layer is drawn off through line 13 and returned to the hold-up tank 7.

The benzene-benzene hexachloride phase is discharged from the settling drum 11 through line 15 to pump 37 and thence to a coagulator 16. As heretofore mentioned, the settling operation does not fully remove the aqueous caustic phase. The emulsified caustic solution is coalesced by passing the benzene-benzene hexachloride layer through closely packed, inert fibrous material in container 16. It has been found that fibrous borosilicate glass of 0.0002 to 0.0003 fiber diameter is an excellent fibrous material for this purpose. The fibrous glass is packed to give an apparent density of 1000 to 1500 grams per cubic foot for best results. A suitable circulation rate is up to 6000 gallons of solution per hour per cubic foot.

The liquid leaving the container 16 comprises the purified benzene-benzene hexachloride phase and the aqueous caustic phase. The mixture is fed to separatory drum 18 through line 17. The caustic layer settles out and is withdrawn through line 19 and discarded. The purified solution of benzene hexachloride in benzene is withdrawn from the top of drum 18 and transferred to the recovery operation.

*Recovery of benzene hexachloride*

The market or quality requirements for benzene hexachloride have not yet been precisely established. There are however a number of qualities which are desired by the insecticide trade. These include a uniform white color, uniform concentrations of gamma isomer, and "grindability." The last characteristic refers to the ease with which the benzene hexachloride can be reduced to a fine powder and incorporated with other components of insecticide mixes.

It is difficult to recover by conventional methods a product with the above characteristics. Thus, if crystallization and filtration are employed, a laborious drying step is required. When a steam distillation is carried out, the product tends to cake up or become lumpy.

We have found a simple recovery method by which benzene hexachloride can be isolated from the purified solution produced as heretofore described. Our method comprises vaporizing the benzene and fusing the benzene hexachloride at an elevated temperature. These two operations can be carried out separately. However, a preferred method of carrying out the recovery operation comprises simultaneously vaporizing the benzene and fusing the benzene hexachloride. This is done by flowing the purified solution over a corrosion resistant heat transfer surface maintained at an elevated temperature above the fusion temperature of the benzene hexachloride. The benzene is immediately flashed or vaporized off and the benzene hexachloride is fused to a flowable liquid.

In all embodiments of the recovery operation, the exposure time at the fused temperature is limited to a period which does not exceed the decomposition period at the operating temperature. We have found that the period in which benzene hexachloride remains stable decreases linearly with temperatures above 160° C. Thus, benzene hexachloride can be maintained at 160° C. for up to 4.2 minutes before darkening or other decomposition occurs. At 200° C., the allowable exposure time is up to 2 minutes. At intermediate temperatures, the limiting time of exposure can be linearly interpolated between these times.

The fusion temperature employed in the recovery operation can be varied widely. In general a temperature at or above the fusion temperature of benzene-free benzene hexachloride is used. By fusion we mean the absence of any solid phases. The exact fusion temperature of benzene-free benzene hexachloride is somewhat dependent upon the relative proportions of the various isomeric forms of the compound present. However, the usual distribution of the isomeric forms in the average product is such that it will be fused at a temperature of 160° C. or above. It is interesting to note that this temperature is slightly above the fusion temperature of pure alpha isomer, and below the fusion point of two isomers. It is believed that, at the temperature cited, the two higher melting isomers dissolve in the three higher melting forms to give a liquid or fused system. At a temperature of 235° C. or over, benzene hexachloride decomposes very rapidly and temperatures in this range are not permissible. The preferred temperature range is 160° C. to 215° C.

In some instances, it is desirable to carry out the recovery operation in two separate steps. The first step is the low temperature vaporization of the major part of the benzene content of the solution. The benzene hexachloride is thus concentrated into viscous solution which may contain solid benzene hexachloride dependent upon the amount of benzene removed. This concentrated benzene hexachloride stream is then separately heated to a temperature of 160° C. or above, driving off residual benzene and fusing the benzene hexachloride product.

The initial low temperature vaporization is normally carried out in a reboiler-type heat exchanger. As an alternative, the purified solution can be stripped of a large part of the benzene content by a partial pressure process. In this mode of operation, the solution of benzene hexachloride is countercurrently contacted with an inert gas stream. This is suitably done in a wetted wall stripping unit, wherein the feed solution is fed to the inside wall of a cylindrical column. A rising stream of heated inert gas strips the benzene from the solution. By either mode of operation, all but a small portion of the benzene content is removed. For example, by heating a 25 weight percent solution of benzene hexachloride to 100° C., approximately 80 percent of the benzene content is vaporized. If the initial vaporization involves heating the material to 130° C., approximately 95 percent of the benzene is vaporized.

The final or "finishing off" step in the two-step operation is carried out by heating the concentrated benzene hexachloride to the aforementioned fusion temperature. This heating drives off the residual benzene and contributes greatly to the quality of the final product. By fusing the benzene hexachloride at the elevated temperature, the appearance, grindability and free flowing characteristics of the final product are greatly improved.

It is highly desirable that the "finishing off" or fusion step be carried out in corrosion resistant equipment. We have found that ordinary mild steel is unsatisfactory for this service. The preferred materials of construction for the heat transfer surface for the fusion step are nickel, alloys of nickel and copper, and stainless steel.

Subsequent to the "finishing off" or fusion step, the molten benzene hexachloride is cooled and solidified. Before packaging or storage the solidified product is comminuted. A preferred method of solidifying and comminuting the molten product involves the use of a drum flaker. If desired, however, the benzene hexachloride can be cast in solid blocks and subsequently ground.

Referring to the accompanying figure showing the preferred embodiment, purified solution is transferred to the recovery operation by line 20. The main parts of the recovery equipment are a heat transfer element 21, a benzene condensing shell 23, and a caster-comminuter 30.

The purified feed solution is fed by line 20 to one or more distributing pipe rings 35. These rings are perforated for discharge of the solution as a uniform film on the surface of heat transfer element 21. This unit is of circular cross section and is maintained at an elevated temperature by means of steam fed through line 28.

The feed solution flows down the outer surface of element 21, the benzene being vaporized and the benzene hexachloride being heated to the desired fusion temperature. Molten benzene hexachloride drips from the end of heat transfer element 21 and is discharged by funnel 25 to caster comminuter 30. Funnel 25 is double walled, so that the interior surface in contact with the benzene hexachloride can be maintained at the same elevated temperature as heat transfer element 21. This is done by steam supplied by line 26, condensate being discharged by line 27.

The molten benzene hexachloride is distributed on the surface of the rotating comminuter-caster drum 30 by the action of a heated distributor bar 31. The drum 30 is cooled by water or other coolant circulated through lines 32 and 33. The solidified benzene hexachloride is scraped from drum 30 by blade 38 and falls into container 34.

Benzene vaporized from the solution fills disengaging space 41 and is condensed on shell 23. Heat is removed by cooling water circulated by lines 39 and 40. The condensed benzene flows downwardly and is discharged through line 43. Pump 24 recycles the benzene to the reaction equipment through line 2.

Having described the principal steps of the process, an example of the combined or integrated operation in a commercial scale unit is described below. The process description following is an example of the preferred embodiment illustrated by the figure.

A recycle stream containing 1078 pounds of benzene and 22 pounds of dissolved benzene hexachloride is fed to the system by line 2. Fresh benzene is added by line 1 at the rate of 100 pounds per hour, the two benzene-containing streams being jointly fed to pump 36. Gaseous chlorine is introduced through line 3 at the rate of 253 pounds, and dissolves in the mixed benzene-containing streams. The combined feed streams to the reactor are then 1453 pounds per hour, containing 81 weight percent benzene, 17.5 chlorine and 1.5 benzene hexachloride.

The solution is fed to reactor 5 through line 4. The solution is completely irradiated therein for approximately 15 minutes with light predominating in the 4000 to 7000 angstrom unit wave band. The temperature of the reacting materials varies somewhat with the progress of the stream through the reactor. The reaction proceeds most rapidly in the first several tubes of the reactor. The temperature in this region is from 57 or 58 to 50° C. As the mixture proceeds toward the outlet, the temperature decreases, the exit temperature being 35 to 38° C. The chlorine content is almost completely converted to benzene hexachloride. The reactor effluent contains 25 weight percent benzene hexachloride and approximately 75 weight percent benzene. Small amounts of unreacted chlorine, about 0.1 weight percent, and hydrogen chloride, about 0.03 weight percent, are also present.

The hydrogen chloride and chlorine impurities are neutralized by centrifugally contacting with aqueous caustic solution as heretofore described. From 175 to 200 gallons of 5 weight percent caustic is used per hour to treat the reactor solution, although greater or lesser amounts can be used.

The small quantity of emulsified caustic solution not settled from the benzene hexachloride solution by the settling drum 11 is coalesced by passing the solution through the fibrous glass in coagulator 16. The separate phase of caustic solution thus formed is separated in drum 18 but amounts to only a few gallons per hour and is customarily ditched through line 19.

The benzene hexachloride solution is maintained at approximately the same temperature in the purification section as upon its discharge from the reactor. By maintaining this elevated temperature, the formation of solid benzene hexachloride is avoided and plugging of lines or valves is prevented. The purified benzene hexachloride solution is a clear liquid, completely free of free chlorine and hydrogen chloride.

The heating element 21 of the recovery section is heated to an elevated temperature by use of steam at 200 pounds per square inch pressure. The benzene vapor is immediately vaporized and then molten benzene hexachloride product is discharged from the funnel 25 at a temperature of approximately 190° C. The maximum allowable exposure time at this temperature is roughly 160 seconds. A heat transfer element 15 feet high and 2 feet to 3 feet in diameter has capacity for processing much more than the 1450 pounds of solution in this instance. The residence time, or exposure time, at the operating temperature is not more than approximately five seconds. This ensures that there will be no charring or decomposition of the final product.

The molten benzene hexachloride dropped from the funnel 25 is rapidly chilled and solidified on the surface of rotating drum 30. The drum surface is maintained at about 30° C. by cooling water circulated through lines 32 and 33. A heated distributor bar 31 smooths the benzene hexachloride into a thin uniform layer while it is still hot enough to be plastic. A scraper blade 38 removes the solidified product which drops into container 34. From the 1453 pounds of 25 percent benzene hexachloride solution, 341 pounds of benzene hexachloride is recovered. This contains less than one percent unreacted benzene and appears as a dry, white, free-flowing flaked material. This corresponds to a 98 percent recovery of the chlorine fed as benzene hexachloride, and approximately 90 percent recovery of the benzene.

It will be seen from the foregoing specification that our process solves the problems peculiar to the manufacture of benzene hexachloride. By utilizing a limited quantity of chlorine in the reaction step, we provide a reacted solution containing no solids. This purification step is thus rendered more efficient and the recovery operation is made possible. As the benzene hexachloride is freed of impurities before it is isolated as a solid product, the properties desired in the insecticide trade are benefitted.

In addition to the foregoing illustrative examples, numerous variations in our process can be practiced within the scope of the following claims.

We claim:

1. A continuous process for the manufacture of benzene hexachloride which comprises reacting chlorine and benzene to form benzene hexachloride dissolved in excess benzene, treating the resulting material with an aqueous caustic solution maintained at at least 3% concentration to neutralize acidic ingredients of this material, settling an aqueous layer from the resulting neutralized mixture, separating said layer therefrom, then passing the neutralized benzene solution through a bed of inert fibrous material to coalesce traces of aqueous material remaining in the decanted solution and separating the so-formed aqueous droplets therefrom by a second settling and decanting operation.

2. A continuous process for the manufacture of benzene hexachloride comprising reacting chlorine with benzene at a temperature of between 30 and 60° C. to form a concentration of from 15 to 28 weight per cent benzene hexachloride upon substantially complete conversion thereto, thereby producing a solution free of solid benzene hexachloride, centrifugally contacting the solution with approximately an equal volume of an aqueous solution containing over three weight per cent caustic, settling the caustic solution from the solution of benzene hexachloride, passing the benzene hexachloride solution through a bed of glass fibers whereby emulsified residual solution is coalesced, removing the coalesced residual solution, separating part of the benzene hexachloride from the benzene solution so purified and recycling said separated benzene solution containing from 2 to 15 weight percent benzene hexachloride to the zone wherein it is reacted with chlorine as aforesaid.

LEO A. MILLER.
JAMES H. DUNN.
CLARENCE M. NEHER.
STEPHEN N. HALL.

REFERENCES CITED

The following references are of record in the file of this patent:

UNITED STATES PATENTS

| Number | Name | Date |
|---|---|---|
| 1,815,366 | Stratford | July 21, 1931 |
| 1,947,709 | Garrison et al. | Feb. 20, 1934 |

FOREIGN PATENTS

| Number | Country | Date |
|---|---|---|
| 611,234 | Great Britain | Oct. 27, 1948 |

OTHER REFERENCES

Callaham: "Chem. and Met. Eng.," vol. 51, pp. 112–4 (1944).

"Chemical Abstracts," vol. 41, col. 4111 (1947), abstract of article by Bezobrazov et al.